(12) United States Patent
Wells et al.

(10) Patent No.: US 6,798,920 B1
(45) Date of Patent: Sep. 28, 2004

(54) METHOD FOR HALF TONE PHASE MATCHING AT RUN BOUNDARIES

(75) Inventors: Terry C. Wells, Long Beach, CA (US); Jon S. McElvain, El Segundo, CA (US); David E. Rumph, Pasadena, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/538,597

(22) Filed: Mar. 29, 2000

(51) Int. Cl.⁷ .............................................. H04N 1/409
(52) U.S. Cl. ..................... 382/275; 358/1.9; 358/3.26; 358/3.27
(58) Field of Search ................................ 382/275, 245, 382/151, 167, 232, 294; 358/1.1–1.9, 1.11–1.18, 537, 401, 3.26, 3.27, 426.02, 3.2, 426.15, 426.16, 448, 452, 453, 3.11, 3.12, 3.1; 345/55, 621, 674, 788, 794, 33; 715/521, 526, 517, 540

(56) References Cited

U.S. PATENT DOCUMENTS 5,249,242 A * 9/1993 Hanson et al. ............... 382/269
5,687,303 A * 11/1997 Motamed et al. ........... 358/1.18
6,178,011 B1 * 1/2001 Lin et al. ...................... 358/1.9
6,357,847 B1 * 3/2002 Ellson et al. .................. 347/12
6,704,123 B1 * 3/2004 Av-Shalom et al. ........ 358/2.99

* cited by examiner

Primary Examiner—King Y. Poon

(57) ABSTRACT

A method for correcting a white line artifact between low and high frequency printed pixels. A printer may be able to print either a high or low frequency halftone pixels in some locations, but may be able to print only high frequency halftone pixels in other locations, the latter known as out of phase locations. If the image data is in run length encoded form, and the printer tries to print a low frequency pixel in an out of phase location, no pixel will be printed in that location and a white space results. The remedy is to test at the beginning and end of low frequency runs bordering high frequency runs. If the first (last) low frequency pixel of an original run is in an out of phase location, a one pixel run of the high frequency screen and of the low frequency color is added before (after) the original run, and the run length of the low frequency run is decreased by one pixel.

1 Claim, 1 Drawing Sheet

(1) Time Periods (2) High Frequency Threshold (3) High Frequency Dots (4) Low Frequency Threshold (5) Low Frequency Dots (6) Phase (7) Image Flag (8) Printed Dots (9) Printed Color
[P=Picture T=Text]

(10) First and Last Dot of Low Frequency Run

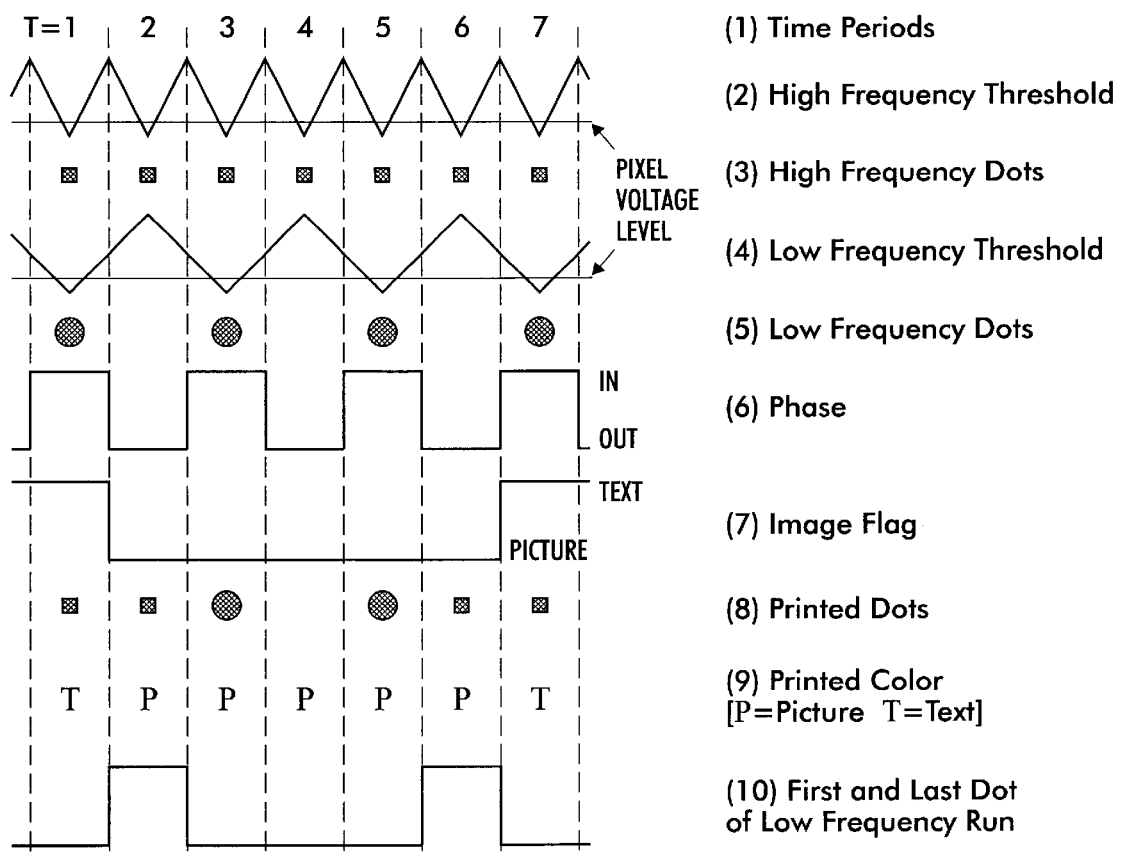

METHOD FOR HALF TONE PHASE MATCHING AT RUN BOUNDARIES

BACKGROUND OF THE INVENTION

A method of filling in the white line artifact that appears at the boundary between two printed regions of an image, where the two printed areas have a different halftone frequency specification, by identifying the fast scan coordinate of the single pixel where the white area is produced and filling it in with a high frequency pixel using a color equal to the lower frequency color. In digital printers, a higher frequency halftone pattern is typically used for text for greater edge enhancement while a lower frequency halftone pattern is used to enable a greater stability of color rendering. The Digital Front End (DFE) or raster processor determines which of the two should be used, based on object type or other specified rendering characteristics. For example, a high "tag" on the data would indicate that text is being supplied to the printer so the high frequency pixels should be used, and a low "tag" on the data would indicate low frequency pixels for constant color or color pictures. To preserve the best possible text edge, the system must be capable of switching at the boundary between the high frequency and low frequency screens. This leads to a possible phase problem in that for some locations both the high and low frequency screen patterns can apply toner, whereas for others only the high frequency screen can apply toner. If the DFE specifies switching from high to low (or vice-versa) at the beginning of a pixel location that can not be printed with the low frequency halftone screen, no toner will be applied, and an undesirable white space is produced. This is especially noticeable if both bordering colors are dark. A remedy is needed which fills the space with the correct color while still preserving an accurate text edge.

SUMMARY OF THE INVENTION

This invention addresses this problem by modifying the data while in the run length encoded format (before the data is sent to the printing device). In this data description, a run consists of a contiguous set of pixels along a single raster line (scan line) with similar attributes. It is typically described by a color, start position, and length, as well as any rendering attributes (such as which halftone screen should be used). In this sense, object edges in the fast scan direction are easily determined, since abutting runs are assumed to have different attributes. The method involves inspecting the halftone screen specification of abutting runs in the fast scan direction. If a screen boundary exists at the interface, the location of the boundary pixel of the low frequency run is inspected to determine whether or not toner will actually be applied at that pixel. If the location of this low-frequency boundary pixel is found to be "out of phase" with respect to the halftone screen pattern of the printing device (i.e. the screen does not apply toner at this location), the interface will be modified; otherwise it will be untouched. Modification is a two step procedure, involving first the reduction in length of the low frequency run at the interface by one pixel, and second inserting a new single pixel run at that location with a color equal to that of the "deleted" pixel, while using the high frequency halftone screen. This ensures that the objectionable white gap at object/screen interfaces will be eliminated.

BRIEF DESCRIPTION OF THE DRAWINGS

FIG. 1 is a timing diagram of the invention.

DETAILED DESCRIPTION OF THE INVENTION

FIG. 1 shows the timing and logic relationships between the various signal states in seven time periods T=1 through T=7 of the raster scan, as shown in line (1). Time is represented in this figure, as the printing device uses this signal to determine which pixels to write as it traverses a scanline. Therefore there is a 1 to 1 correspondence between the time scale represented and the spatial placement of toner on the printed image.

A typical analog halftone generator is being assumed, with its high frequency sawtooth waveform shown on line (2). The halftone generator is a comparator circuit that applies toner at locations where the pixel voltage level is greater than the sawtooth level, as indicated on line (3) of FIG. 1. As the pixel voltage increases, the size of the halftone dot also increases.

The lower frequency waveform is shown on line (4) and will produce lower frequency dots as shown on line (5) as circles.

The higher and lower frequency pixels are produced either in phase, where both can be produced, or out of phase, where a higher frequency pixel can be produced but a lower frequency pixel can not. This is shown on line (6), which indicates the times during which periods the pixels are in or out of phase.

Line (7) shows an example of how the printed image can be switched between text and constant color regions in the data specification. In this example, the text is specified to be printed during time periods T=1 and T=7, and color is to be printed during periods T=2 through T=6. This is shown at line (9).

The problem can occur, as shown, at the start or end of the constant color region, if the first or last time period (pixel) of the constant color region occurs when the pixels are out of phase. In the case shown in FIG. 1, the first time period of the color, T=2, and the last time period, T=6, occur when the pixels are out of phase. Since these edge pixels are part of the low frequency region, no toner will be applied, because the pixels are out of phase. The result will be a single pixel of white space on the printed page.

The remedy is to determine if the current pixel is either the first or last pixel of the color as in line (10), and if, for this time period, the pixels are out of phase as in line (6). If both, then, the remedy is to print a high frequency dot, but using the low frequency color. The result is shown in line (8), where, during T=2 and T=6, a high frequency dot in the low frequency color is printed.

The above discussion assumed an analog voltage input to the halftone screening process. This will typically be supplied as a series of digital pixels, each in the form of a digital number, and converted to an analog voltage by a digital to analog converter. In its original form, then, the image data would be a series of numerical values, and would typically be run length encoded, each run containing the number of pixels of identical color, a numerical value of that color, and an indication of the type of data such as high or low-frequency screen. Thus, a five pixel run of low frequency between two areas of high frequency could be oversimplified to be (5 pixels, low frequency pixel, low frequency color).

For a scan line, some pixel locations are in phase, and some out of phase. For example, as in line (6) all low frequency pixels are in phase for odd numbered time periods, at T=1, 3, 5, etc. For the next scan line the arrangement could be different, such as all even. Therefore, at any point in the data path, the phase of any location can be predetermined for any line. Also, because of the nature of the run length encoded data format, the first and last pixel of any given run is always known.

Thus, calculating the phase at the first and last pixel locations of the low frequency run will indicate whether or not to insert a one high frequency pixel run length of low frequency color. If high frequency pixels are added to the beginning and end, as in line (8), the numerical example above of the run, (5 pixels, low freq pixel, low freq color)

becomes (1 pixel, high frequency pixel, low frequency color), (3 pixels, low freq pixel, low freq color), (1 pixel, high frequency pixel, low frequency color).

Now, the resultant run length encoded image data stream can be decoded, halftoned and printed directly without producing the artifact, since no low frequency pixels are specified at object boundaries that fall on out of phase locations.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method of correcting the white line artifact at the boundary between low and high frequency pixels of image data in run length encoded form comprising the steps of:

locating an original run length of low frequency data which has a boundary with high frequency data, determining whether the first or last pixel of the original run is on the boundary and is in a location where the high and low frequency screens are out of phase, if the location is an out of phase location,
  a) decrease the low frequency run length by one,
  b) create a one pixel run for a high frequency pixel at the low frequency color, and
  c) insert the one pixel run in the image data before the original run if it is the first pixel of the original run that is out of phase, or after the original run if it is the last pixel that is out of phase.

* * * * *